Dec. 9, 1952 — A. L. ALLEN — 2,620,615
ADJUSTABLE CUTTER BAR FOR MOWING MACHINES
Filed Feb. 25, 1948 — 2 SHEETS—SHEET 2
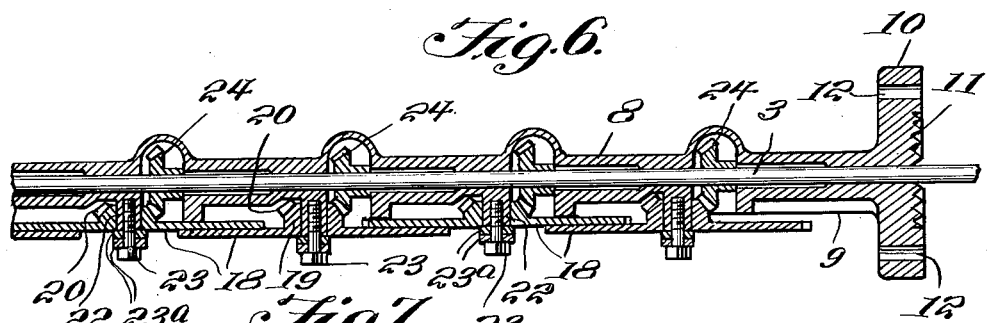
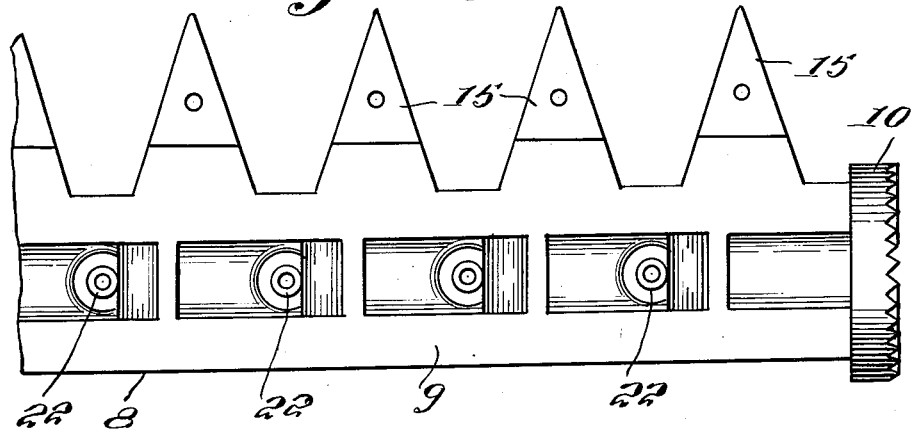
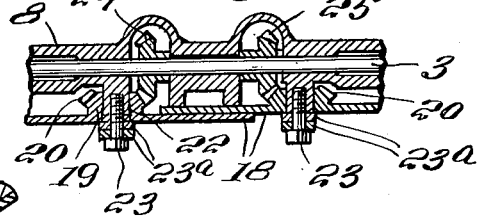
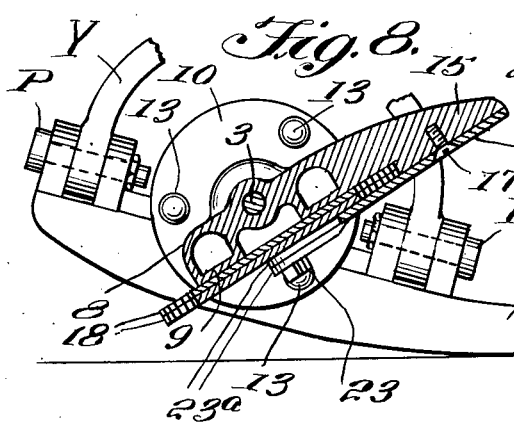
INVENTOR.
Ambrose L. Allen,
BY Victor J. Evans & Co.
ATTORNEYS Patented Dec. 9, 1952

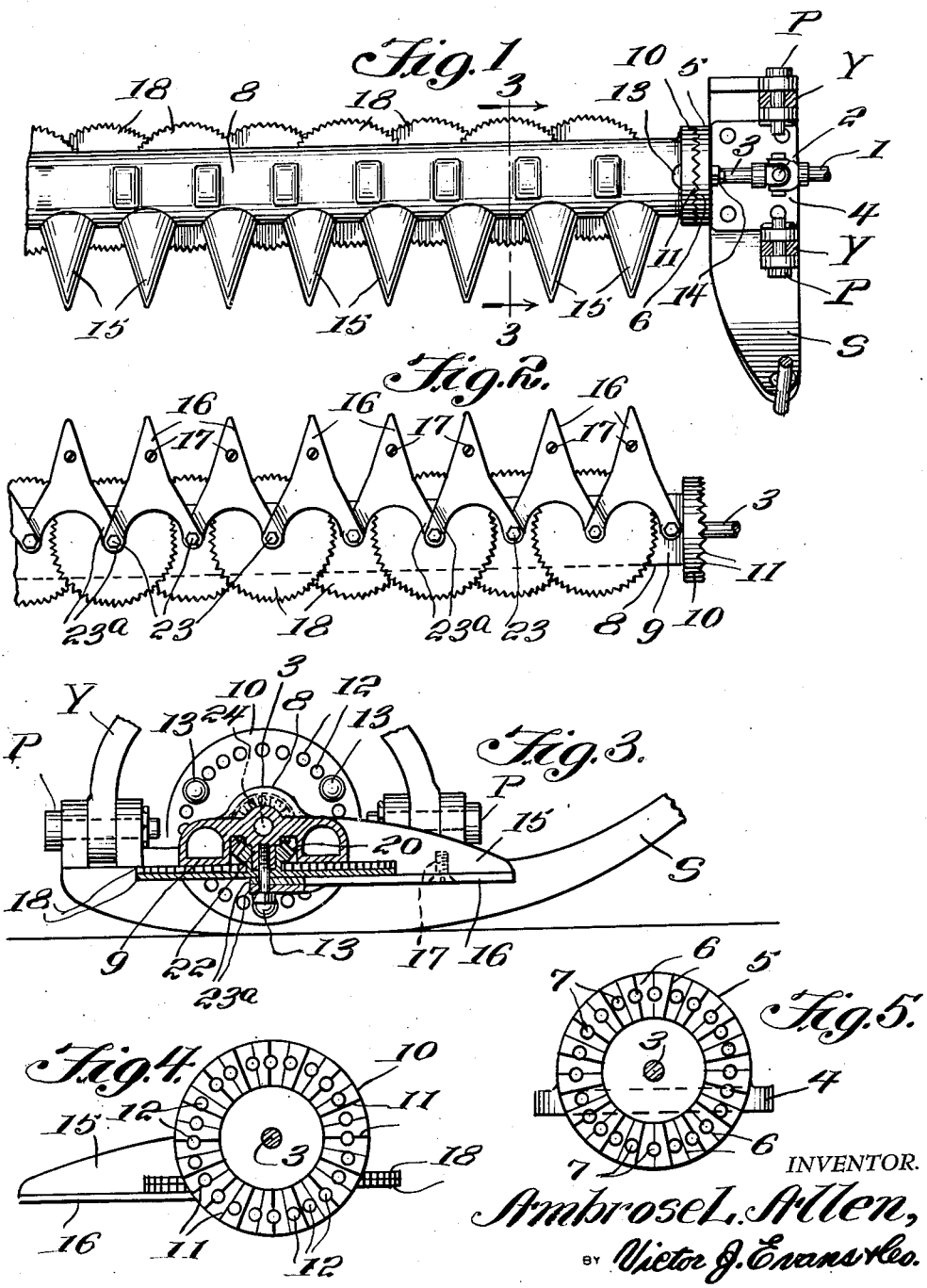

2,620,615

UNITED STATES PATENT OFFICE 2,620,615

ADJUSTABLE CUTTER BAR FOR MOWING MACHINES

Ambrose L. Allen, Houston, Tex.

Application February 25, 1948, Serial No. 10,705

1 Claim. (Cl. 56—287)

This invention relates to the general class of harvesters or side cutting mowing machines of the rotary cutter type, and more specifically to an improved rotatably adjustable mowing machine that involves improvements upon the mowing machine in my prior Patent No. 1,784,327, dated December 9, 1930. My patented mowing machine includes a laterally extending cutter mechanism having horizontally disposed and rotary cutting disks, and the primary purpose of the present invention is the provision of means whereby the cutting mechanism of my prior patent may readily be rotatably adjusted for mowing the standing grain at different desirable heights from the ground.

The invention involves a minimum number of parts that may be manufactured with facility and low cost of production, and the parts may be assembled with convenience and installed as component parts of the mowing machine in order that desired adjustments may be made with a minimum expenditure of time and labor.

The improvements forming the subject matter of my invention consist in certain novel features of construction and combinations and arrangements of parts as will hereinafter be described and more particularly set forth in the appended claims. In the accompanying drawings I have illustrated a complete example of a physical embodiment of my invention wherein the parts are combined and arranged in accord with one mode I have devised for the practical application of the principles of my invention.

It will however be understood that changes and alterations are contemplated and may be made in these exemplifying drawings and mechanical structures, within the scope of my claim, without departing from the principles of the invention.

Figure 1 is a plan view with parts in horizontal section showing so much of a side cutting mower as is necessary to illustrate the embodiment of my invention; and Figure 2 is a bottom plan view of the cutting mechanism.

Figure 3 is an enlarged detail vertical sectional view at line 3—3 of Fig. 1.

Figure 4 is an inner end view of the tubular housing forming the cutter bar and showing the face of its rotatable adjusting head.

Figure 5 is an outer end view of the shoe housing showing the face of the stationary head.

Figure 6 is a sectional view of the tubular cutting bar or housing, showing the longitudinally extending disk-operating shaft and connections.

Figure 7 is an enlarged bottom plan view of the tubular cutter bar with its adjusting clamp head.

Figure 8 is a transverse sectional view through the cutting mechanism which is shown in adjusted position; and Figure 9 is a fragmentary longitudinal sectional view through the tubular cutter bar showing the adjoining disks rotated in opposite directions.

In order that the general arrangement and utility of parts may readily be understood I have shown in the assembly view Fig. 1 the side-cutting mechanism mounted upon the usual inner shoe S to which the suspending yoke Y is pivoted at P, and the yoke suspends the mechanism at the side of the mowing machine as usual. Power is supplied from the mowing machine through the drive shaft 1 having a flexible or universal joint 2 to the operating shaft or power shaft 3 for the mechanism. A base plate 4 is bolted on the upper part of the shoe S, and this plate is fashioned with a vertically disposed supporting head 5, here shown as a circular disk that is fashioned with radial clamping teeth 6, and an annular series of bolt holes 7.

The operating shaft 3 is journaled in a central bearing of the stationary head 5, and the shaft extends through bearings in a housing 8 having a flat plate 9, which housing forms a tubular cutter bar for the cutting mechanism. This tubular cutter bar is rotatably adjustable about the shaft 3 as an axis, and means are provided for clamping the tubular cutter bar to the stationary supporting head 5. For this purpose the tubular cutter bar, at its inner end, is equipped with a vertically disposed adjusting head or disk 10, having face-teeth 11 and an annular series of bolt holes 12 complementary to the teeth and holes of the fixed supporting head 5, and three or more clamping bolts 13 with nuts 14 are employed in the two series of bolt holes for rigidly clamping the rotatably adjustable cutter bar to the supporting head. By this rotatable adjustment of the cutter bar and the cutters mounted thereon, the machine may be adjusted for cutting the standing grain at different and desired heights from the ground or surface of the field.

The tubular cutter bar is provided with the usual spaced and integral guard holders 15, and the guard fingers 16 projecting toward the front of the cutting mechanism are fastened to their holders by screws 17. The rotary cutters 18, in the form of overlapping disks, are mounted against the flat plate 9 of the tubular cutter bar, and each disk is fashioned with a central bearing bushing 19, or hub that is fashioned with radial teeth 20, to perform the functions of an integral bevel pinion by means of which the cutter is rotated.

The pinion-hubs 20—19 are each mounted on a bearing bushing 22 integral with and projecting radially from the longitudinal center of the tubular cutter bar, and a bolt 23, which is passed through perforated attaching lugs 23a of the finger guards 15, is employed to fasten each rotary cutter to the cutter bar.

The spaced cutters are rotated in one direction by means of a series of driving bevel pinions or gears 24 mounted on the shaft 1 and in operative engagement with the complementary driven pinions or driven hubs of the cutter disks.

In the modified arrangement in Fig. 9 two series of driving pinions are employed, as 24 and 25, for operating or rotating the cutters, i. e. adjoining or overlapping cutters, in opposite directions, and the adjoining guard fingers guide the standing grain toward the front meeting edges of the adjoining cutters, and these meeting edges of the overlapped cutters sever the grain.

In Figs. 3 and 8, the cutters are shown in varying altitudes or distances above the ground surface for cutting the standing grain at different heights, and it will be apparent that the cutter bar, with the cutters, may be rotatably adjusted within a wide range, and then by means of the adjustable attaching head 10 and the fixed supporting head 5, together with the clamping bolts 13, the cutter bar may rigidly be mounted in desired position for operation of the mowing machine.

Having thus fully described my invention, what I claim as new and desire to secure by Letters Patent is:

In a mowing machine, a ground engaging supporting shoe, a base plate secured to the upper portion of said shoe, a stationary head mounted on said base plate and positioned in a vertical plane parallel to the general line of movement of said shoe, a cutter bar extending outwardly from said shoe, a disc integrally connected with said cutter bar and arranged in face to face relationship with respect to said head, and inter-engaging means on said head and disc for maintaining said disc immobile in its adjusted position.

AMBROSE L. ALLEN.

REFERENCES CITED

The following references are of record in the file of this patent:

UNITED STATES PATENTS

| Number | Name | Date |
|---|---|---|
| 438,759 | Crandell | Oct. 21, 1890 |
| 777,093 | Hartman | Dec. 13, 1904 |
| 1,101,164 | Champ | June 23, 1914 |
| 1,307,160 | Stokes | June 17, 1919 |
| 1,536,514 | Mehls | May 5, 1925 |
| 1,784,327 | Allen | Dec. 9, 1930 |
| 2,275,259 | Johnson | Mar. 3, 1942 |
| 2,340,488 | Paradise | Feb. 1, 1944 |